(12) United States Patent
Frait et al.

(10) Patent No.: US 9,421,857 B2
(45) Date of Patent: Aug. 23, 2016

(54) MODULAR POWERTRAIN COMPONENT FOR HYBRID ELECTRIC VEHICLES

(71) Applicant: FORD GLOBAL TECHNOLOGIES, LLC, Dearborn, MI (US)

(72) Inventors: Steven A. Frait, Milan, MI (US); John E. Brevick, Livonia, MI (US); Keith A. Devereaux, Roseville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 267 days.

(21) Appl. No.: 14/154,229

(22) Filed: Jan. 14, 2014

(65) Prior Publication Data

US 2014/0128219 A1     May 8, 2014

Related U.S. Application Data

(63) Continuation-in-part of application No. 13/362,018, filed on Jan. 31, 2012.

(51) Int. Cl.
*F16H 47/00*      (2006.01)
*B60K 6/48*       (2007.10)
*B60K 6/405*      (2007.10)

(52) U.S. Cl.
CPC . *B60K 6/48* (2013.01); *B60K 6/405* (2013.01); *B60Y 2304/076* (2013.01); *B60Y 2400/426* (2013.01); *Y02T 10/6221* (2013.01); *Y10S 903/902* (2013.01); *Y10T 477/26* (2015.01)

(58) Field of Classification Search
CPC .......... B60K 6/48; B60K 6/367; B60K 6/405; B60K 2006/4825
USPC ......................................... 74/665, 730.1, 661
See application file for complete search history.

(56) References Cited

U.S. PATENT DOCUMENTS

| | | | |
|---|---|---|---|
| 7,679,238 B2 | 3/2010 | Nomura et al. | |
| 2007/0007095 A1 | 1/2007 | Tsukamoto et al. | |
| 2008/0093135 A1 | 4/2008 | Nomura et al. | |
| 2008/0099258 A1* | 5/2008 | Berhan | B60K 6/405 180/65.22 |
| 2010/0038201 A1* | 2/2010 | Mueller | F16D 25/0638 192/3.29 |
| 2010/0062899 A1* | 3/2010 | Engelmann | F16D 25/0638 477/86 |
| 2010/0105518 A1 | 4/2010 | Kasuya et al. | |
| 2010/0105519 A1 | 4/2010 | Kasuya et al. | |
| 2011/0011692 A1* | 1/2011 | Kuehnle | F16D 25/0638 192/3.33 |
| 2011/0239818 A1 | 10/2011 | Kasuya et al. | |
| 2011/0240430 A1 | 10/2011 | Iwase et al. | |
| 2011/0240431 A1* | 10/2011 | Iwase | B60K 6/26 192/3.29 |

\* cited by examiner

*Primary Examiner* — Ha D Ho
(74) *Attorney, Agent, or Firm* — David B. Kelley; MacMillan, Sobanski & Todd, LLC

(57) ABSTRACT

An assembly includes a torque converter including a casing supported for rotation about an axis, a rotor hub secured to the torque converter casing for rotation about the axis, a leg member secured to and supporting the rotor hub for rotation about the axis, and an electric machine including a rotor secured to the rotor hub.

14 Claims, 3 Drawing Sheets

US 9,421,857 B2

MODULAR POWERTRAIN COMPONENT FOR HYBRID ELECTRIC VEHICLES

CROSS REFERENCE TO RELATED APPLICATIONS

This is a continuation-in-part application of pending U.S. application Ser. No. 13/362,018, filed Jan. 31, 2012.

BACKGROUND OF INVENTION

This invention relates to a powertrain of hybrid electric vehicles.

Hybrid electric vehicles (HEVs) have both an internal combustion engine and an electric machine, which are alternately, or in combination, used to propel the vehicle. A variety of different powertrains are used in hybrid vehicles such as a parallel configuration, in which the engine is connected to the motor by a disconnect clutch with the motor driving a torque converter input of an automatic power transmission. The transmission has an output which is connected to a differential coupled to the two driven wheels of the vehicle.

A need exists in the industry for a hybrid electric powertrain that includes a modular subassembly for use with a variety of engines and transmissions, such that the module can be installed between and secured to an output of one of a number of engines and to an input of one of a number of transmissions. The assembled powertrain may then be employed in a variety of vehicles. The module should include a hydraulically actuated disconnect clutch, the electric machine and suitable power paths between the engine and electric machine to the transmission input. Preferably, the module provides for hydraulic communication from the transmission's hydraulic system to the clutch, a balance dam and the electric machine. The module must provide an oil sump containing hydraulic fluid delivered to the module, and a path for continually returning that fluid to the transmission's oil sump so that the transmission pump is continually supplied reliably with fluid.

The module should require low manufacturing and assembly costs and no vehicle body modification, and should provide reliable performance.

SUMMARY OF INVENTION

An assembly includes a torque converter including a casing supported for rotation about an axis, a rotor hub secured to the torque converter casing for rotation about the axis, a leg member secured to and supporting the rotor hub for rotation about the axis, and an electric machine including a rotor secured to the rotor hub.

This assembly incorporates the module into the torque converter, thereby turning the bell housing from a dry cavity to a wet cavity, simplifying oil management and oil drain back to the transmission.

The assembly has fewer parts and requires a shorter axial length than a powertrain having a wet cavity that is hydraulically sealed and separated from a dry environment in the bell housing.

Hydraulic fluid for actuating the disconnect clutch is supplied through the transmission input shaft, thereby simplifying the hydraulic system.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1A:
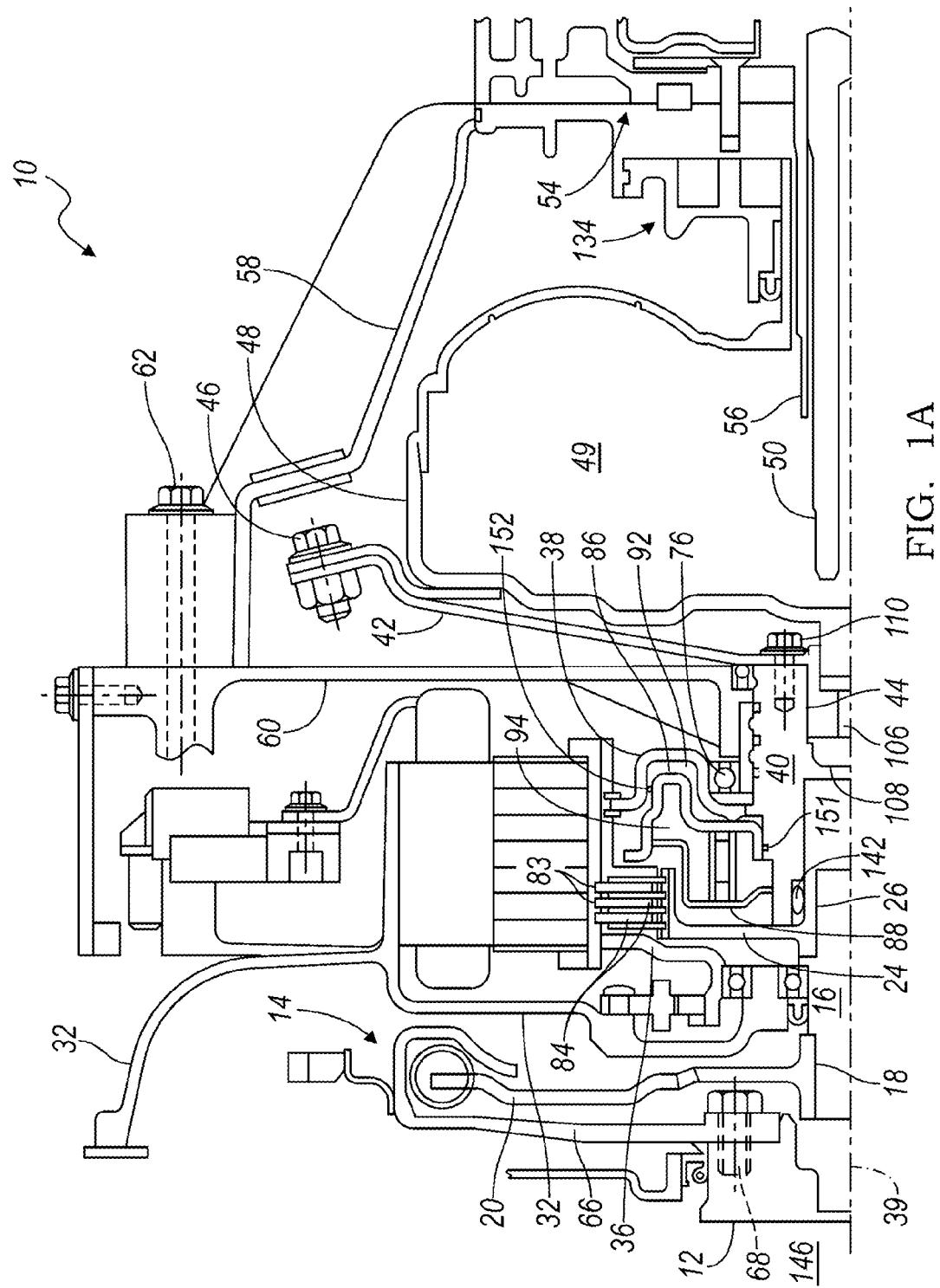
FIGS. 1A and 1B comprise a side cross-sectional view of a powertrain module showing a front connection to an engine output and a rear connection to a transmission torque converter input.
Figure 1B:
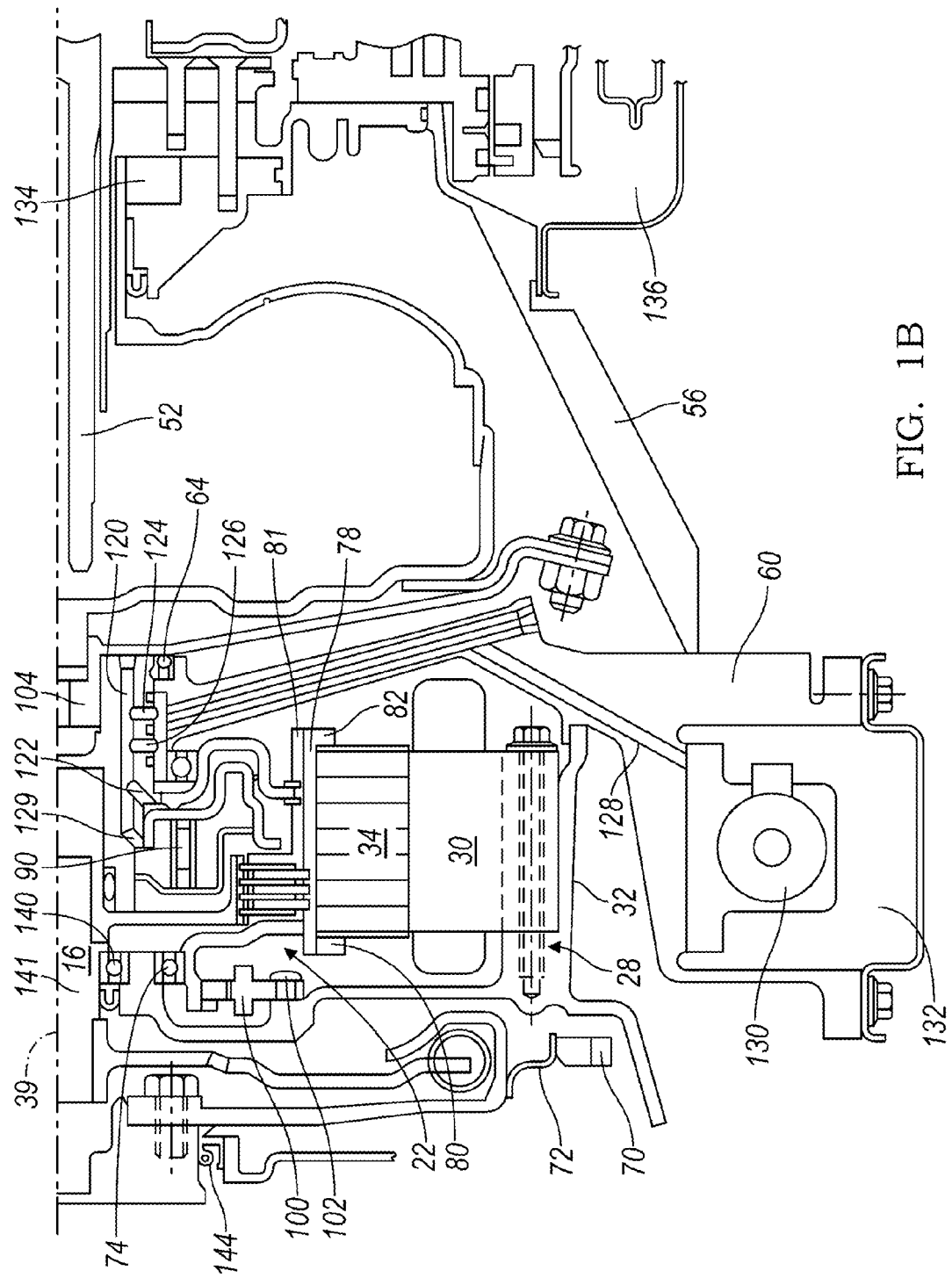

FIGS. 1A and 1B illustrate a module 10 of a powertrain for a hybrid electric vehicle that includes an engine having a rotary output 12; a torsional damper 14, secured to the engine output 12; an input shaft 16, secured by a spline 18 to an output 20 of damper 14; a disconnect clutch 22, supported on a clutch hub 24 that is secured by a spline 26 to input shaft 16; an electric machine 28, which includes a stator 30 bolted to a front bulkhead 32 and a rotor 34 supported by a first leg 36 and a second leg 38 for rotation about an axis 39; a rotor hub 40, secured preferably by a weld to leg 38; and a flexplate 42, secured at one end by a spline connection 44 to rotor hub 40 and secured at the opposite end by bolts 46 to a torque converter casing 48, which encloses a hydrokinetic torque converter 49. The electric machine 28 may be an electric motor or an electric motor-generator.

Torque converters suitable for use in the powertrain are disclosed in and described with reference to FIGS. 4a, 4b, 5, 12 and 15 of U.S. patent application Ser. No. 13/325,101, filed Dec. 14, 2011, the entire disclosure of which is herein incorporated by reference.

The torque converter 49 includes a bladed impeller wheel located within and secured to casing 48; a bladed turbine, driven hydrokinetically by the impeller and secured by a spline 50 to the input shaft 52 of an automatic transmission 54; and a bladed stator wheel, located between the turbine and stator and secured to a stator shaft 56, which is held against rotation on a transmission housing 58.

A rear bulkhead 60, secured by bolts 62 to the transmission housing 58, is fitted at its radial inner surface with a hydraulic seal 64, which contacts the radial outer surface of rotor hub 40.

A flywheel 66, secured by bolts 68 to the engine's rotary output 12, carries an engine starting gear 70, which is secured by a disc 72, welded to the starting gear and flywheel.

A bearing 74 supports the first leg 36 for rotation on the front bulkhead 32. A bearing 76 supports the second leg 38 for rotation on the rotor hub 40. A tube 78, aligned with axis 39 and supporting the rotor 34 for rotation about the axis, is secured to the first leg 36 and second leg 38. Lips 80, 82 at the front and rear ends, respectively, of tube 78 may be rolled radially outward to secure the rotor 34 to tube 78 and to prevent axial displacement of the rotor 34 relative to the tube. The inner surface of tube 78 is formed with an axial spline 81, which is engaged by the legs 36, 38 and alternate plates 83 of the disconnect clutch 22. The friction plates 84 of clutch 22 are secured by an axial spline formed on the radial outer surface of clutch hub 24.

A hydraulic servo for actuating clutch 22 includes a piston 86, balance dam 88, return spring 90 and hydraulic lines for transmitting actuating pressure to the pressure control volume 92 at the right hand side of piston 86 and to the pressure balance volume 94 at the left hand side of the piston. Piston 86 moves leftward in a cylinder formed by the rear leg 38 when actuating pressure and hydraulic fluid is supplied to volume 92, by the use of seals 151 and 152, thereby causing clutch 22 to engage and driveably connect rotor 34 and the engine output 12 through damper 14, input shaft 16, clutch hub 24 and clutch 22.

Because the piston 86, balance dam 88 and return spring 90 are supported on the rotor hub 40, rotational inertia of the piston 86, balance dam 88 and return spring 90 is located on the output side, i.e., the rotor side of clutch 22.

Rotor 34 is continually driveably connected to the transmission input shaft 52 through the torque path that includes rear leg 38, rotor hub 40, flexplate 42, torque converter casing 48, the hydrodynamic drive connection between the torque converter impeller and turbine, which is connected by spline 50 to transmission input shaft 52.

A resolver 100, a highly accurate type of rotary electrical transformer used for measuring degrees of rotation, is secured by bolts 102 to the front bulkhead 32, is supported on the front bulkhead 32 and first leg, and is located axially between the front bulkhead 32 and rear bulkhead 60.

The teeth of spline 44, which produces a rotary drive connection between flexplate 42 and rotor hub 40, are fitted together such that no lash is produced when torque is transmitted between the flexplate and rotor hub. Flexplate 42 is formed with a thick walled portion 104 having a threaded hole 106 that terminate at a web 108. The external spline teeth on flexplate 42 are forced axially into engagement with the internal spline teeth on rotor hub 40 by bolts 110, which engage threaded holes in the right-hand end of rotor hub 40. The engaged spline teeth at the spline connection 44 are disengaged upon removing bolts 110 and threading a larger bolt into hole 106 such that the bolt contacts web, thereby forcing flexplate axial rightward.

Rotor hub 40 is formed with multiple axially-directed hydraulic passages 120 and laterally-directed passages 122, 124, 126, 128, 129, which carry hydraulic fluid and pressure to module 10 from the hydraulic system of the transmission 54. Passages 120, 122, 124, 126, 128, 129 carry hydraulic fluid and pressure which includes to the control volume 92 of the servo of clutch 22 located at the right hand side of piston 86, to the pressure balance volume 94 between balance dam 88 and the piston, to a variable force solenoid (VFS) 130, and to the surfaces of rotor 34 and stator 30, which surfaces are cooled by the fluid. The rear bulkhead 60 is formed with passage 128, which communicates hydraulically with VFS 130.

The rear bulkhead 60 supports a sump 132, which contains fluid supplied to module 10 from the hydraulic system of the transmission 54. Transmission 54 includes a sump 136, which contains hydraulic fluid that is supplied by a transmission pump 134 to the transmission hydraulic system, from which fluid and control pressure is supplied to module 10, torque converter 49, transmission clutches and brakes, bearings, shafts, gears, etc.

A bearing 140, fitted in the front bulkhead 32, and a bearing 142, fitted in the rotor hub 40, support input shaft 16 in rotation about axis 39. The front bulkhead 32 also supports the stator 30 in its proper axial and radial positions relative to the rotor 34. Bearing 76, fitted between rear bulkhead 60 and rotor hub 40, and bearing 142 support rotor hub 40 in rotation about axis 39. The front and rear bulkheads 32, 60 together support rotor 34 in rotation about axis 39 due to bearing 74, fitted in bulkhead 32, and bearing 76, fitted in bulkhead 60.

Seal 64, fitted in the rear bulkhead 60, and seal 141, fitted in the front bulkhead 32, prevent passage of fluid from module 10 located between the bulkheads 32, 60. Another dynamic seal 144 prevents passage of contaminants between the engine compartment 146 and module 10.

The components of module 10 are installed and assembled in the module. The assembled module can then be installed between and connected to the engine output 12 and the torque converter casing 48.

In operation, when the engine output 12 is driven by an engine, torque is transmitted from the engine through rotor hub 40 and flexplate 42 to the torque converter casing 48, provided that clutch 22 is engaged. The rotor 34 electric machine 28 is continually driveably connected through tube 78, leg 38, rotor hub 40 and flexplate 42 to the torque converter casing 48. Therefore, the torque converter casing 48 can be driven by the engine alone, provided the electric machine 28 is off and clutch 22 is engaged; by the electric machine alone, provided the engine is off or the engine in operating and the clutch is disengaged; and by both the engine and electric machine concurrently.

Figure 2:
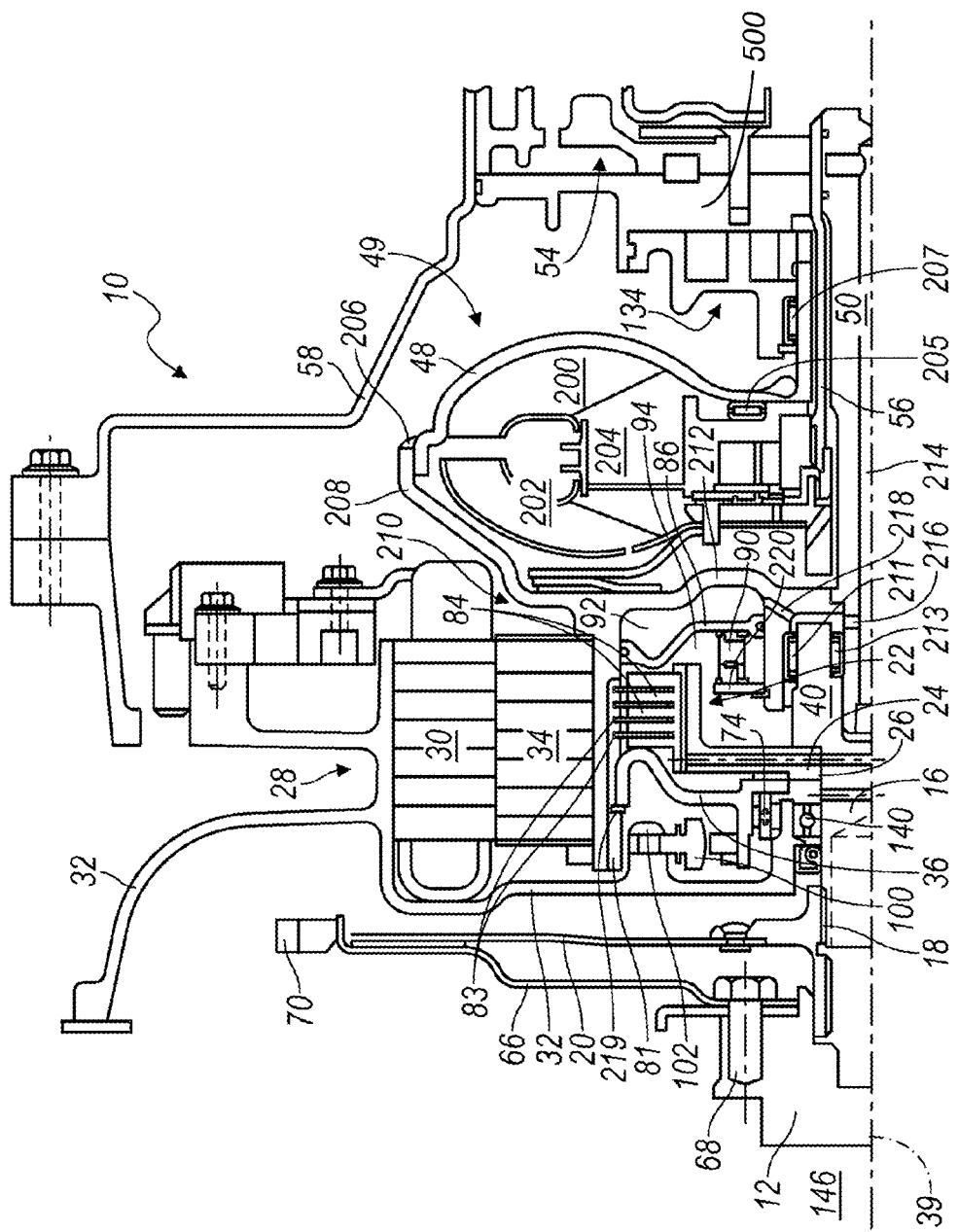
FIG. 2 is a side cross-sectional view of the powertrain showing the rear bulkhead removed and the rotor supported on the torque converter casing.

FIG. 2 is a side cross-sectional view of the powertrain showing the rotor 34 of the electric machine 28 supported on the torque converter casing 48.

Torque converter 49 includes an impeller 200, secured to torque converter casing 48; a turbine 202 connected to transmission input shaft 50; and a stator 204, held against rotation on stator shaft 56. Casing 48 is supported for rotation about axis 39 by a bearing 207. Thrust bearing 205 reacts stator thrust load to casing 48. The portion 48 of the torque converter casing that is secured to impeller 200 is connected by a weld 206 to housing 208 of the rotor hub 210. The rotor hub 210 is secured by spline 81 to forward leg 36, which is supported in rotation about axis 39 by bearing 74. The rotor hub 210 is formed with a radial leg 212, which supports shaft 16 and shaft 50 in rotation about axis 39 by bearings 211, 213. The rotor 34 of the electric machine 28, which is secured to rotor hub 210, is thus supported for rotation about axis 39 by support 36 and bearing 74 to housing 32 (this is the main radial support of the rotor 34). This positioning has the bearing 74 under the rotor 34 and controls the airgap between rotor 34 and stator 30. By having both the rotor 34 positioning and the stator 30 positioning being controlled in the same housing 32, a very precise control of the motor airgap can be achieved using traditional automotive manufacturing methods. A retainer 219, such as a C-clip, limits axial movement of the clutch plates 83, 84 and leg member 36 along the spline 81. The casing 48 supports the transmission side of the torque converter 49 with the use of bearing 207 in the pump housing. The bearing is axially far away from the rotor 34, so its influence on the airgap is minimal, which is desired, since this bearing's radial position is may not be very accurate, due to part tolerances on the pump housing, pump intermediate plate 500 and transmission casting 58.

Axial passage 214 and radial passage 216 carry hydraulic fluid in transmission input shaft 50 to a passage 218. Passage 218 communicates with cylinder 92 of the servo that actuates disconnect clutch 22. Passage 218 and cylinder 92 are formed in the rotor hub 210, and piston 86 is located in cylinder 92. A return spring 90, located between a disc 220 secured to rotor hub 210 and piston 86, urges piston away from contact with the plates of disconnect clutch 22.

Module 10 integrates the hydraulic system of transmission 54 with the hydraulic system of the disconnect clutch 22.

Module 10 turns the bell housing area from a dry cavity to a wet cavity, thereby simplifying oil management and oil drain back to the transmission 54.

In accordance with the provisions of the patent statutes, the preferred embodiment has been described. However, it should be noted that the alternate embodiments can be practiced otherwise than as specifically illustrated and described.

What is claimed is:

1. An assembly, comprising:
   a torque converter including a casing supported for rotation about an axis;
   a hub forming part of the torque converter casing;
   a clutch including first plates secured to the hub via a spline;
   a leg fixed against axial displacement and supporting the hub via the spline;
   a retainer limiting axial movement of the first plates and leg on the spline;
   an electric machine rotor secured to the hub.

2. The assembly of claim 1, further comprising:
   a piston for forcing the first plates along the spline toward the retainer, a radially outer end of the piston sealed against and slidable along the hub, and a radially inner end of the piston sealed against and slidable along the hub.

3. The assembly of claim 2, wherein the clutch alternately opens and closes a drive connection between a power source and the hub.

4. The assembly of claim 2, further comprising:
   a clutch hub including a second spline; and
   second plates interleaved with the first plates and secured to the clutch hub by the second spline.

5. The assembly of claim 1, further comprising:
   a cylinder formed by an axially extending radially outer wall of the hub, an axially extending radially inner wall of the hub and a radially extending wall of the hub;
   a piston located in the cylinder; and
   passages for carrying hydraulic fluid to the cylinder, one of the passages extending through the hub.

6. The assembly of claim 1, further comprising a first bearing fixed against axial displacement, contacting the leg and supporting the hub in rotation about the axis.

7. The assembly of claim 6, further comprising a second bearing contacting the hub and radially supporting the hub in rotation about the axis.

8. The assembly of claim 7, further comprising a third bearing radially supporting the torque converter casing for rotation about the axis.

9. An assembly, comprising:
   a torque converter supported for rotation about an axis;
   a hub forming part of a torque converter casing, supported for rotation by a first bearing, including a radial wall extending between radially inner and outer walls to form a cylinder and a passage through the hub for carrying fluid to the cylinder;
   a leg supporting the hub through a second bearing for rotation;
   an electric machine rotor secured to the hub.

10. The assembly of claim 9, further comprising:
    a clutch including first plates secured to the hub via a spline;
    the leg fixed against axial displacement and secured to the hub via the spline;
    a retainer limiting axial movement of the first plates and leg on the spline;
    a piston for forcing the first plates along the spline toward the retainer.

11. The assembly of claim 10, wherein the clutch alternately opens and closes a drive connection between a power source and the hub.

12. The assembly of claim 10, further comprising:
    a clutch hub including a second spline; and
    second plates interleaved with the first plates and secured to the clutch hub by the second spline.

13. The assembly of claim 9, further comprising a third bearing radially supporting the torque converter for rotation about the axis.

14. The assembly of claim 9 including a piston for forcing the first plates along the spline toward the retainer, a radially outer end of the piston sealed against and slidable along the radially outer wall, and a radially inner end of the piston sealed against and slidable along the radially inner wall.

* * * * *